Fig. 1.

INVENTOR.
ANDREW W. ANDERSON
BY
ATTORNEY

Oct. 3, 1967    A. W. ANDERSON    3,344,578
CARTONING MACHINE

Filed Jan. 8, 1964    11 Sheets-Sheet 9

INVENTOR.
ANDREW W. ANDERSON
BY
ATTORNEY

Oct. 3, 1967  A. W. ANDERSON  3,344,578
CARTONING MACHINE

Filed Jan. 8, 1964  11 Sheets-Sheet 10

INVENTOR.
ANDREW W. ANDERSON
BY
*Luther W Hawley*
ATTORNEY

Oct. 3, 1967    A. W. ANDERSON    3,344,578
CARTONING MACHINE

Filed Jan. 8, 1964    11 Sheets-Sheet 11

INVENTOR.
ANDREW W. ANDERSON
BY
Luther W Hawley
ATTORNEY

United States Patent Office 3,344,578
Patented Oct. 3, 1967

3,344,578
CARTONING MACHINE
Andrew W. Anderson, West Caldwell, N.J., assignor to Scandia Packaging Machinery Company, North Arlington, N.J., a corporation of New Jersey
Filed Jan. 8, 1964, Ser. No. 336,437
7 Claims. (Cl. 53—54)

This invention relates to cartoning machines and particularly to means for controlling the various operations performed thereby.

The invention more particularly described relates to a machine for cartoning packages and in the machine the carton blanks are fed to a position to receive and wrap the packages and the packages, such as packages of cigarettes, are fed at right angles to the carton blanks. The cartons after receiving the packages are folded and then raised by an elevator to discharge position.

One of the objects of the invention is to control the carton blank feed in such a manner that blank will not be fed into position to receive the packages unless a full complement of packages has been assembled in position to be wrapped.

Another object of the invention is to so control the elevating mechanism for moving the filled carton that the elevator will not be operated unless a filled carton has been positioned thereon.

Another object of the invention is to provide in a machine of the character described improved blank feed mechanism.

Other objects of the invention will appear in the following specification taken in connection with the drawings forming a part of this application and in which.

The invention briefly described consists of a cartoning machine comprising means for feeding carton blanks one at a time from a hopper to a position at right angles to the path of feed of a plurality of assembled packages. When a full complement of packages has been fed by the package feeding mechanism the carton blank which has been positioned to receive the packages is folded around the advance edge and over the top and bottom of the assembled packages. It is then fed through folding mechanism which tucks the tabs at the advanced edge of the cartons and folds up the tabs which project downwardly from the bottom face of the blank. Thereafter the carton and packages therein are fed to a position on top of an elevator or elevating mechanism and if a full complement of packages is disposed in the carton blank the folded carton is raised by the elevator and the final folding mechanism operates to close the carton.

Control mechanism is embodied in the machine for preventing the downward feed of a carton blank when the full complement of packages has not been positioned to be enclosed in the carton. In other words, in the particular assembled group of packages shown in the drawings there should be two rows of packages with five packages in each row. If one package is missing detector means comes into operation and disconnects the downward feeding mechanism for the carton blank thereby preventing a carton blank from being fed thereby.

Detector means is also provided for the elevator so constructed and arranged that an incomplete complement of packages will be fed out of the machine after being deposited on the elevator and the elevator operating mechanism will not raise the elevator to carton discharge position. The machine further embodies improved means for feeding the blanks downwardly from the hopper and this means will be described during the detailed description in the specification.

In the particular embodiment of the invention illustrated in the drawings the three main drive controls for the operating parts of the machine may be divided up into the hopper and blank feed illustrated particularly in FIGS. 1, 5, 10, 11 and 15, the blank feed control illustrated in FIGS. 1, 5, 6, 7 and 8, and the elevator control illustrated in FIGS. 1 and 17 to 23 inclusive.

*Hopper and blank feed*

Figure 1:
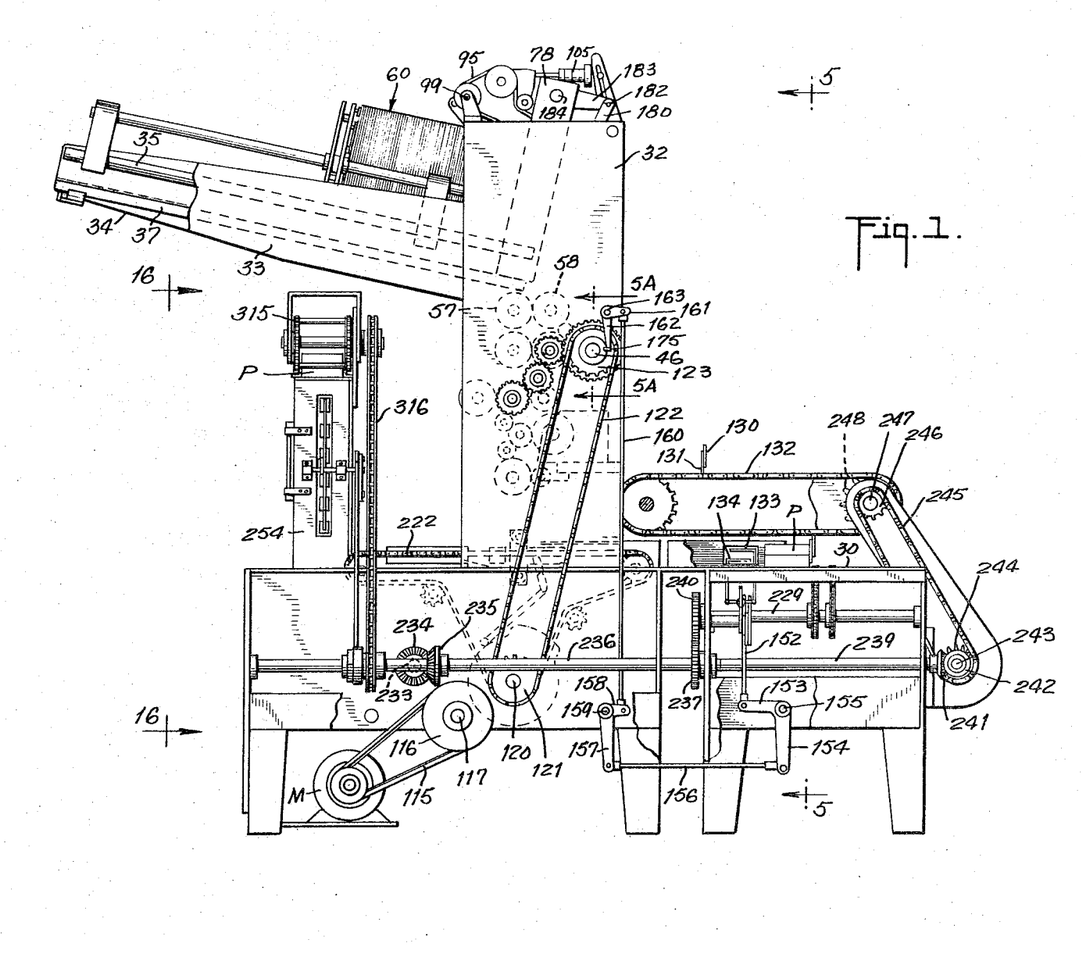
FIG. 1 is a side elevation of a machine embodying the invention.

The machine frame consists mainly of a table or platform 30 on which are mounted upright frames 31 and 32 which support the hopper and blank feed about to be described. The hopper is supported between the upright frames 31 and 32 and extends rearwardly therefrom as shown in FIG. 1. Channel supporting frames 33 and 34 are mounted on the upright supporting frame members 31 and 32 and form supports for the rods 35 at the sides of the hopper between which the blanks are supported.

Figures 11, 12, 13, 14:
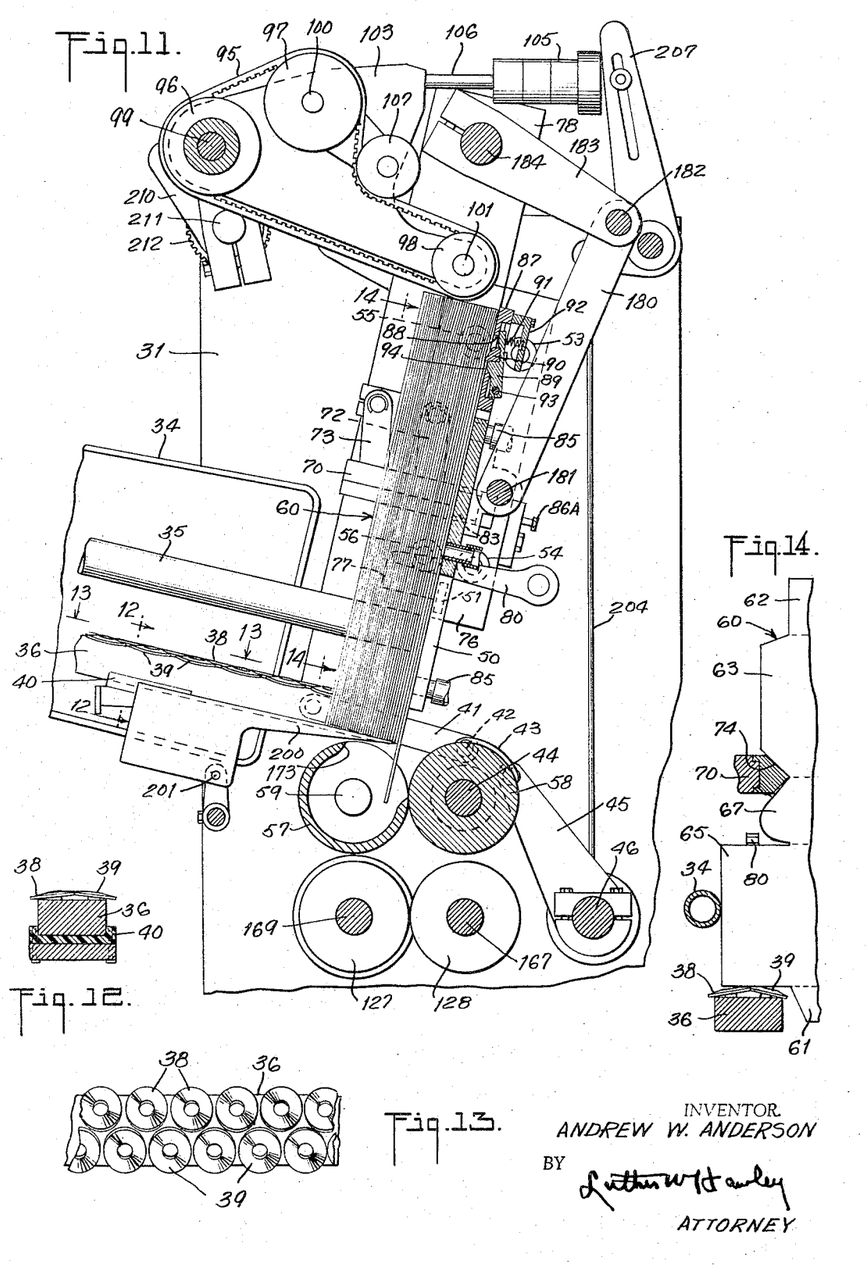
FIG. 11 is a view similar to FIG. 10 but showing one of the blanks or the front blank in the stack partially fed downwardly to the blank feeding mechanism.
FIG. 12 is a sectional elevation taken substantially on line 12—12 of FIG. 11 looking in the direction of the arrows.
FIG. 13 is a plan view of blank supporting discs taken substantially on line 13—13 of FIG. 11 looking in the direction of the arrows.
FIG. 14 is a rear elevational view of the blank and blank supporting and guiding means taken substantially on line 14—14 of FIG. 11 looking in the direction of the arrows.

At the bottom of the hopper there are mounted a pair of bars 36 and 37 which are also supported on the members 33 and 34. These bars as shown particularly in FIGS. 12, 13 and 14 have mounted thereon pairs of discs 38 and 39 which are freely rotatable on spindles extending into the bars and are angularly related with their axes converging downwardly as shown in FIGS. 12 and 13.

The bars 36 and 37 are slidably mounted on channels 40 formed of material in which the bars are freely slidable longitudinally and during the operation of the machine the bars 36 and 37 are oscillated back and forth longitudinally in the following manner. At the front ends of the bars they are connected to links 41 which are pivoted at 42 to a block 43 mounted for free movement on a shaft 44. The block is also pivoted to an arm 45, eccentrically mounted on a shaft 46. As the shaft 46 is rotated in the manner hereinafter described the linkage connection described will oscillate the bars 36 and 37. FIG. 14 illustrates the manner in which the blanks rest on the discs 38 and 39, the blank being engaged at its outer edge by one of the rods 35.

The front end of the hopper is closed by a plate 50 which is mounted between two pairs of side rollers 51 and 52 and also between rollers 53 and 54 in front of the plate and rollers 55 and 56 in the rear of the plate. The plate 50 is movable downwardly to the position shown in FIG. 11 to feed the front blank into position to be engaged by the blank feeding rollers 57 and 58 mounted on spindles 59 and 44.

Figures 2, 3:
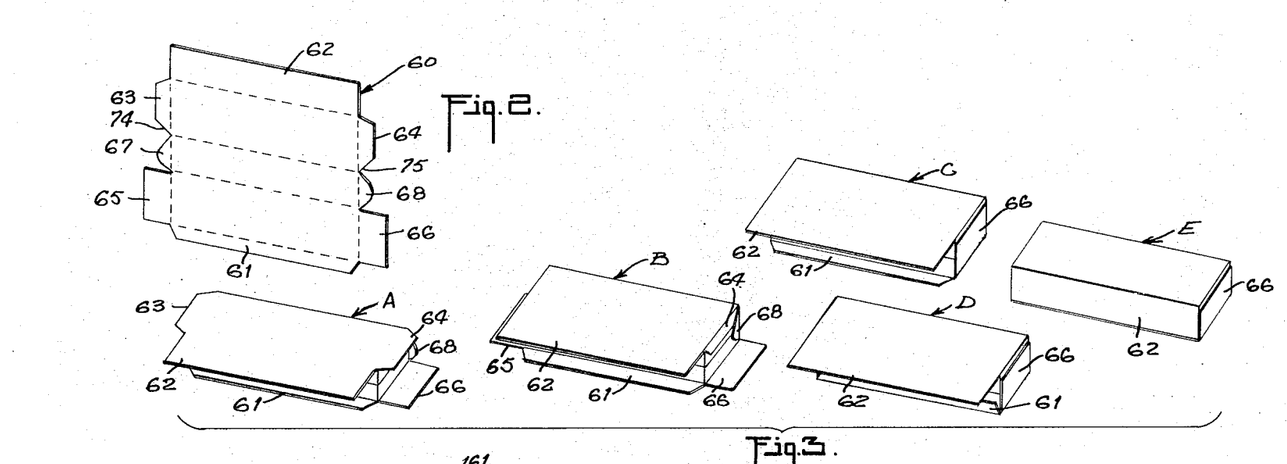
FIG. 2 is a perspective elevation of the blank and showing in perspective the blank as it is folded in the various stages of the operation in wrapping or in closing the package.
FIG. 3 shows in perspective the various stages of folding the blank and closing the packages.

The blank used for forming the carton is illustrated in perspective in FIG. 2 and comprises a main body portion 60, end flaps 63, 64 and 65, 66. Between the two sets of side flaps just mentioned there are similar side flaps 67 and 68 which form end tucks when the blank is folded as hereinafter described.

In order to assist in supporting the blanks in position wedge-shaped bars 70 and 71 are mounted on and pivoted to arms 72 and 73 at the sides of the hopper plate 50 and the wedge-shaped inner ends of these bars extend into notches 74 and 75 formed between the tabs 63, 64 and 67, 68. The bars 70 and 71 and arms 72 and 73 are illustrated particularly in FIGS. 11 and 15.

Figures 10, 10A:
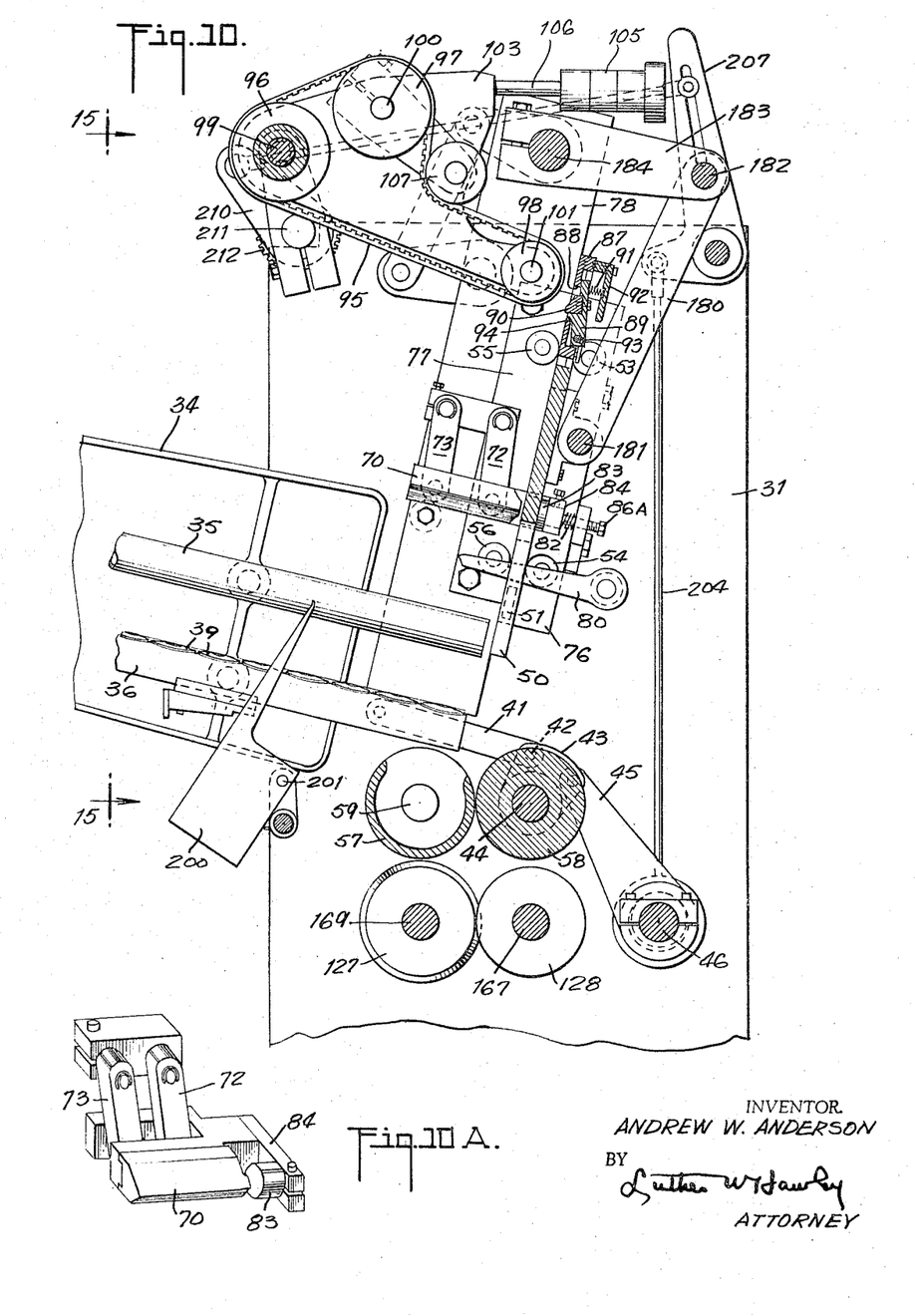
FIG. 10 is a vertical section taken substantially on line 10—10 of FIG. 5 looking in the direction of the arrows.
FIG. 10A is a detail perspective view of the blank supply bars and spacing gap for the blanks.

The blanks, as they are moved downwardly, after they leave the supporting bars 70 and 71, pass through gaps so dimensioned and adjusted as to permit one blank at a time to pass therethrough. The gaps and bars are shown in the detail view numbered 10A. The gaps are formed between the ends of the wedge-shaped bars 70 and 71 and plugs 83 carried by brackets 84 on which the wedge-shaped bars 70 and 71 are adjustably mounted. The brackets 84 and bars 70 and 71 are limited in their forward movement by a set screw 86A. Spring 82 cushions the movement of the brackets and bars.

The rollers 53 and 54 and 55 and 56 and also the side rollers 51 and 52 are mounted on bars 76 and 77 which in turn are carried by vertical plates 78 and 79 supported by the vertical frame members 30 and 31.

The blanks in the hopper are further supported and positioned by a pair of fingers 80 and 81 which extend through openings in the plate and rest on the upper edges of the tabs 65 and 66 of the carton blanks. The plate 50 as above described feeds the front blank downwardly as shown in FIG. 11 and during the retraction or upward movement of the plate the blanks are held in position by the fingers 80 and 81.

In order to hold the blanks in a position in which the front blank closely engages the inner surface of the plate 50 the plate has a plurality of openings therethrough and conduits 85 are connected to the openings and are also connected to a source of suction so that the front blank is sucked against the inner surface of the plate 50. The vacuum in the conduits is suitably controlled so that after the blank is fed downwardly the vacuum is interrupted or turned off temporarily during the upward movement of plate 50.

In order to facilitate the initial downward feed of the front blank the plate 50 has secured thereto over an opening at the upper edge thereof a transverse plate 87 and the plate 87 has a plurality of openings 88 therethrough. In front of each opening there is mounted a block 89 on the upper end of which is mounted a finger 90 which extends through the opening 88 and is normally pressed through the opening by a spring 91 mounted on a bracket 92. The blocks 89 are pivoted as shown at 93 and are limited in their movement in an anti-clockwise direction viewed in FIG. 11 by the projecting upper end 94 of the block 89 which engages a portion of the plate 87 above the opening. The blocks 89 and the fingers 90 are so mounted that the fingers will engage the upper edge of the front blank and will extend through the opening 88 only to a sufficient extent to engage over the upper edge of the front blank so that as the plate 50 is oscillated in the manner about to be described the front blank will be fed downwardly to the position shown in FIG. 11. It will be noted from the showing in FIG. 15 that there are five fingers 90 mounted on the plate 87, which engage the upper edge of the front blank.

In order to assist in feeding the blanks to their forward position against the plate 50 there are a plurality of belts 95 mounted above the blanks on pulleys 96, 97 and 98 which are mounted on a shaft 99 and spindles 100 and 101 which in turn are mounted on plates 102, 103 and 104 pivotally mounted on the shaft 99. The pulleys and plates 102, 103 and 104 are counter-weighted by weights 105 carried by post 106 secured to the plates.

The belts are held in position on the pulleys by idler pulleys 107. From the showing in FIG. 11 it will be noted that the belt shown therein closely engages the upper edges of the blanks and pushes them forward so that they will be held closely in contact with the inner surface of the plate 50.

Figure 24:
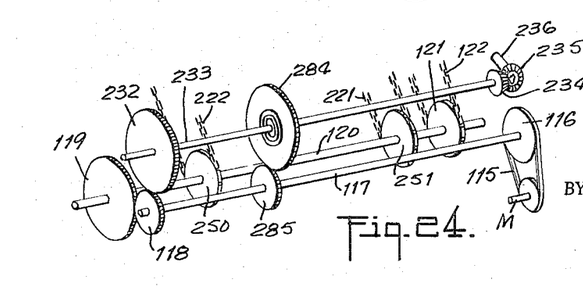
FIG. 24 is a diagrammatic perspective view illustrating the driving connections between the main driving shafts of the machine.

The shaft 99 is driven by an eccentric drive hereinafter described. Attention being directed to FIG. 1, FIG. 5A and FIG. 24, certain of the driving connections will now be described. The motor M drives a belt 115 which through a pulley 116 drives a shaft 117 which carries a gear 118 which meshes with a gear 119 mounted on a shaft 120. Shaft 120 has a sprocket 121 which through a sprocket chain 122 drives a sprocket 123 on the shaft 46. The sprocket 123 on a sleeve 124 which is mounted on the hub 125 which forms one-half of a single revolution clutch. The hub 125 is mounted on shaft 46. A gear 126 is also mounted on the sleeve 124 and through suitable gear connections drives the lower feed rollers for feeding the blank downwardly after the blank has been fed by the two pairs of upper feed rollers 57 and 58 and 127 and 128.

From the foregoing it will be seen that the chain 122 through the sprocket 123 drives the sleeve 124 which forms one-half of a single revolution clutch, the other half of which is formed by the hub 125 on which the sleeve is mounted and drives the lower blank feed rollers continuously. However, the hub 125 is keyed to the shaft 46 and the hub is not driven by the sleeve 124 unless the clutch which is controlled by a pair of feelers hereinafter described indicate that a full complement of packages has been assembled in a position to be fed through the folding mechanism.

*Detector control for blank feed*

Attention is directed particularly to FIGS. 1, 5, 6, 7 and 8 which illustrate the manner in which the detectors operate to control the clutch connection between the two clutch sections 124 and 125.

Figures 5, 5A:
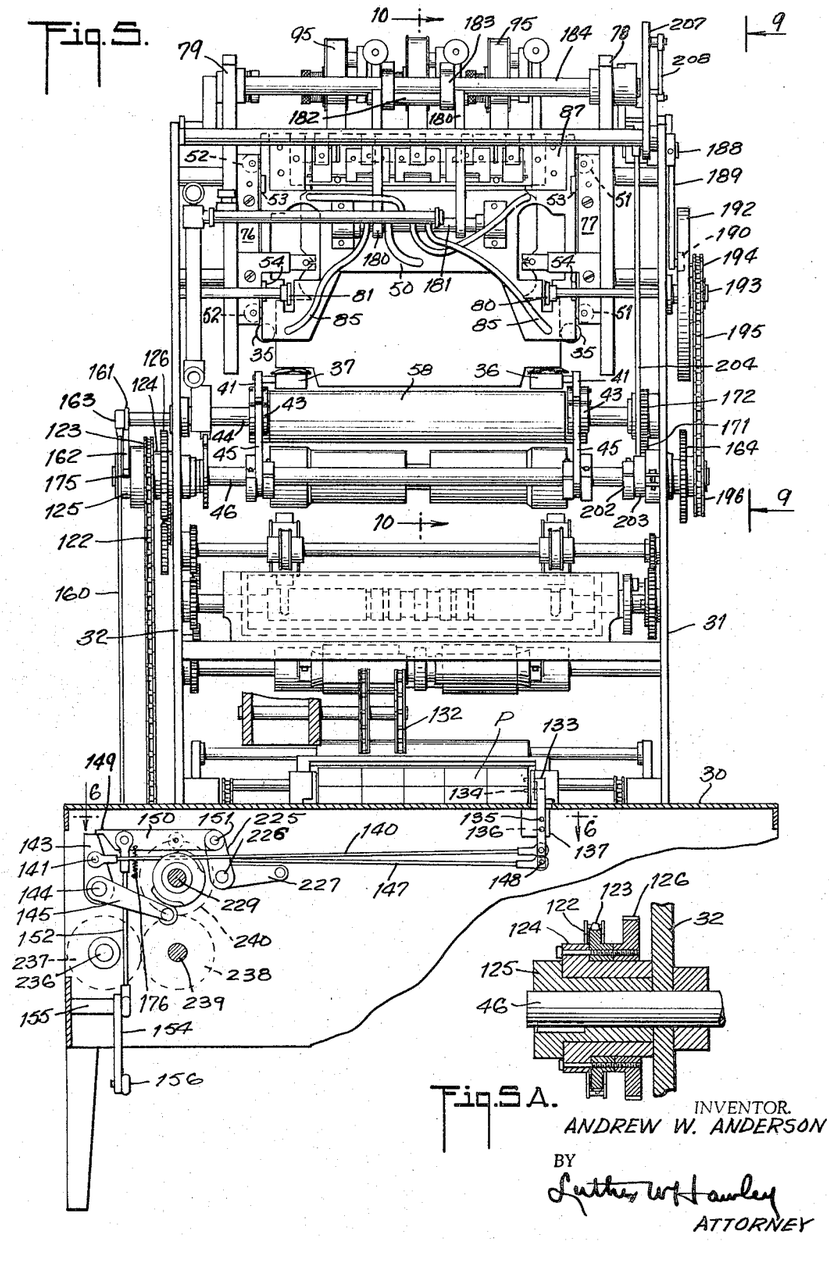
FIG. 5 is an elevational view of the front of the machine taken substantially on line 5—5 of FIG. 1 looking in the direction of the arrows.
FIG. 5A is a detail sectional elevation substantially on the line 5A—5A on FIG. 1 looking in the direction of the arrows.
Figure 6:
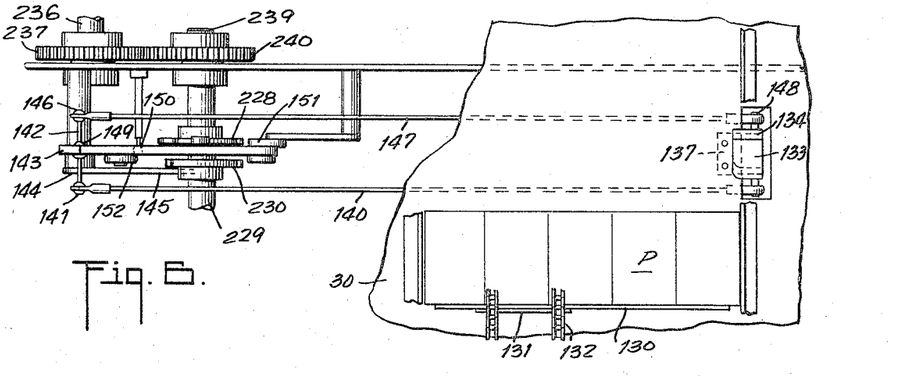
FIG. 6 is a plan view of the package detector mechanism, this view being taken substantially at line 6—6 of FIG. 5 looking in the direction of the arrows.
Figure 7:
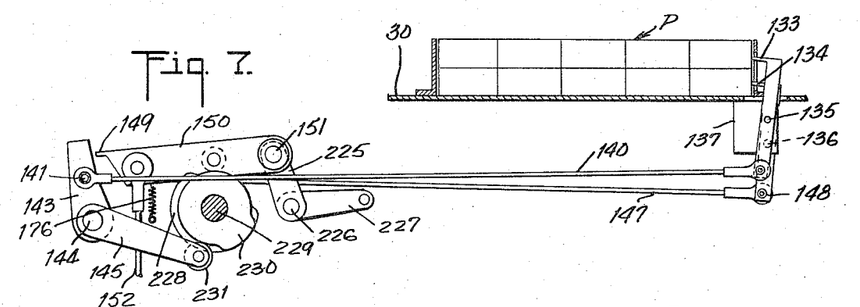
FIG. 7 is an elevational view of the structure shown in FIG. 6 taken at right angles to FIG. 6.
Figure 8:
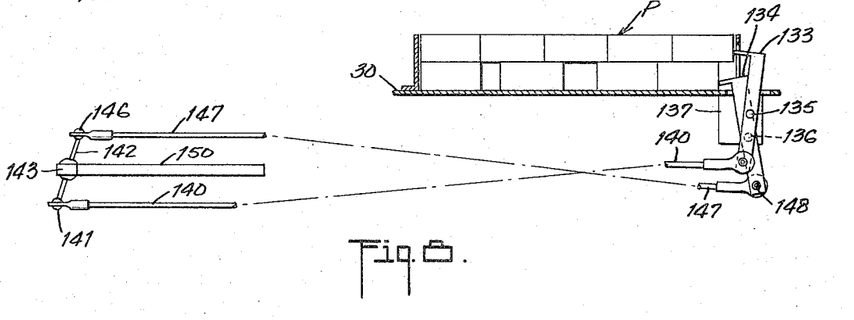
FIG. 8 is a view similar to FIG. 6 but showing the feelers or detectors in the position assumed when one package is missing in the assembled packages.

The packages P are fed in two layers and in the particular embodiment illustrated there are five packages in each layer. These packages are fed on the platform 30 by plates 130 carried by lugs 131 which are mounted on feed chains 132. In FIGS. 6 and 7 the full complement of ten packages has been assembled on the platform 30 in position to be fed by the plates 130. The packages at the back of the rows or layers are engaged by the upper ends of fingers or detectors 133, 134 which are pivoted respectively at 135 and 136 on a block 137 connected to the bottom of the platform 30. In FIG. 8 there is one package missing in the lower row and the detector or finger 134 has been tilted in an anti-clockwise direction. This is due to the fact that the lower end of the finger 133 is connected by a link or rod 140 to one end 141 of a rod 142 which is swivelled at its center to an arm 143 which forms a bell crank lever pivoted at 144, the other arm of the bell crank lever being shown at 145. The other end of the rod 142 is pivoted at 146 to the front end of a link or rod 147 which is pivoted at its rear end at 148 on a lower end of the detector or fiinger 134. The arm 143 of the bell crank lever as shown in FIG. 5 forms a stop for a ledge 149 on one end of a lever 150 mounted on a pivot 151. The lever 150 is spring biased in an anti-clockwise direction by a spring 176 and it is connected by a link 152 to a bell crank lever having arms 153 and 154, the lever being mounted on a fixed pivot 155. The arm 154 is connected by a link 156 to a bell crank lever comprising arms 157 and 158 mounted on a fixed pivot 159. The arm 158 is connected by a link 160 to a bell crank lever comprising arms 161 and 162 mounted on a pivot 163. The arm 162 is so positioned that its lower end is in the path of a clutch control member 175, which controls the operation of the clutch formed by the sleeve 124 and hub 125 shown in FIG. 5A.

In the showing in FIG. 7 there is a full complement of packages in both the upper and lower rollers and the fingers 133 and 134 will be moved in a clockwise direction and through the rods 140 and 147 cause the swivel pin 142 to move the arm 143 from beneath the ledge 149 on the lever 150. This movement will through the linkage and bell crank levers above described tilt the belt crank lever 161, 162 out of the path of the clutch control member 175 permitting the two parts of the clutch to engage, thus driving the shaft 46. This shaft is connected in the manner shown in FIG. 9 by gears 164 and 165 to a gear 166 mounted on a shaft 167 of feed roller 128. Shaft 167 has also mounted thereon a gear 168 which meshes with a gear 170 on shaft 169 on which the roller 127 is mounted. Gear 168 also meshes with an idler 171 which in turn meshes with a gear 172 on the shaft 44 of the roller 58. Gear 172 meshes with a gear 174 on the shaft 59 of the roller 57. As shown in FIG. 11 the feed roller 57 is hollow and has a peripheral opening 173 through which the blank is fed by the downward movement of the plate 50.

As above explained the front blank in the stack is fed downwardly by the fingers 90 carried by the plate 50. The plate 50 has connected thereto links 180 which are mounted at the lower ends on the cross rod 181 and at their upper ends to cross rod 182. Cross rod 182 is connected by arms 183 to a shaft 184. Shaft 184 has connected thereto an arm 185 which is connected by a link 186 to an arm 187 carried by a spindle 188. Spindle 188 also has mounted thereon an arm 189 on the lower end of which is a roller 190 which is positioned in a cam groove 191 to a cam 192 mounted on a stud 193. The cam 192 has secured thereto a sprocket wheel 194 which is connected by a chain 195 to a sprocket wheel 196 mounted on the shaft 46 which is driven in the manner hereinabove described, by the clutch shown in particular in FIG. 5A. From the foregoing it will be seen that the driving connections for reciprocating the plate 50 are operated when the clutch is engaged but that these connections are out of operation when the clutch is held in disengaged position, and the detectors do not indicate a full complement of packages have been assembled.

As the carton blanks reach the forward end of the hopper the front portion thereof is supported from beneath, in addition to the supporting means already described, by three sets of fingers 200 which are pivoted at 201 to a cross rod and are so formed when no blanks are positioned at the forward end of the hopper the fingers will tilt to the position shown in FIG. 10. The front ends of the fingers terminate at a position in the rear of the front carton blank so as to permit it to be fed downwardly as shown in FIG. 11. At the front end of the hopper the blanks are supported by the wedge-shaped bars 70 and 71 and by the fingers 200.

Figure 9:
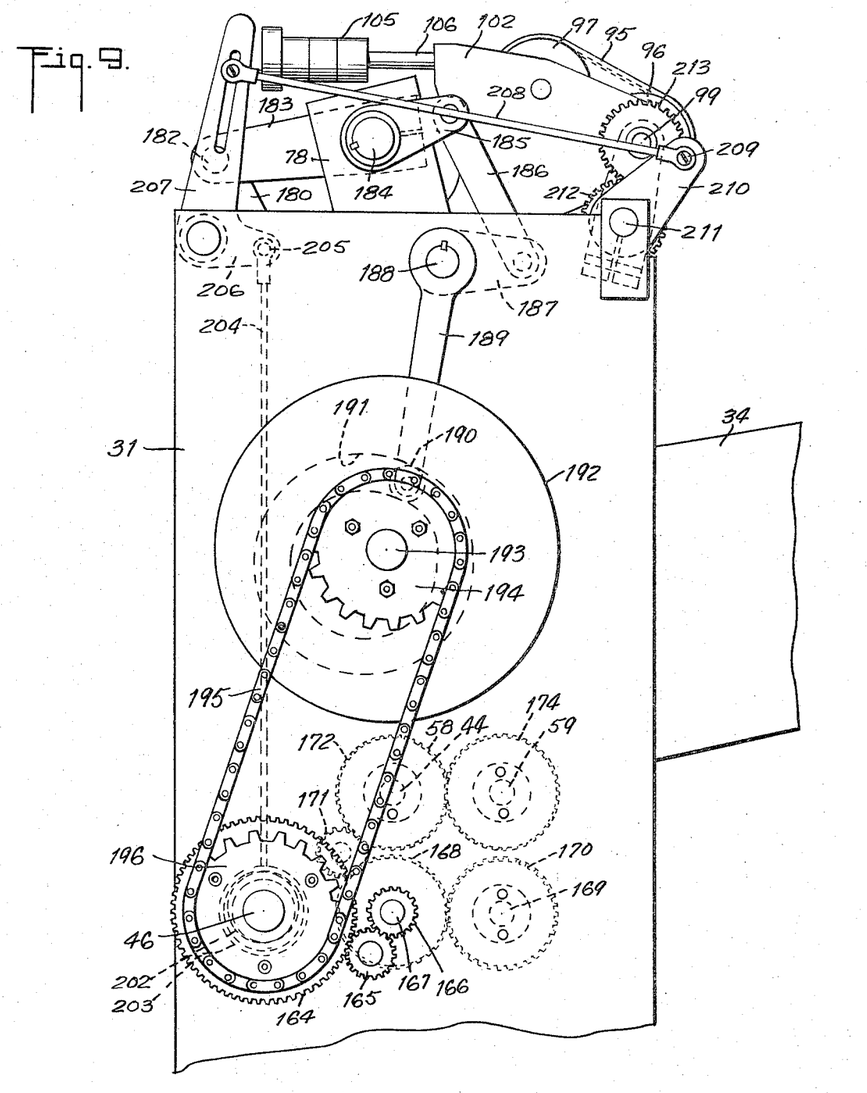
FIG. 9 is a side elevation of one side of the machine taken substantially on line 9—9 of FIG. 5 looking in the direction of the arrows.
Figure 15:
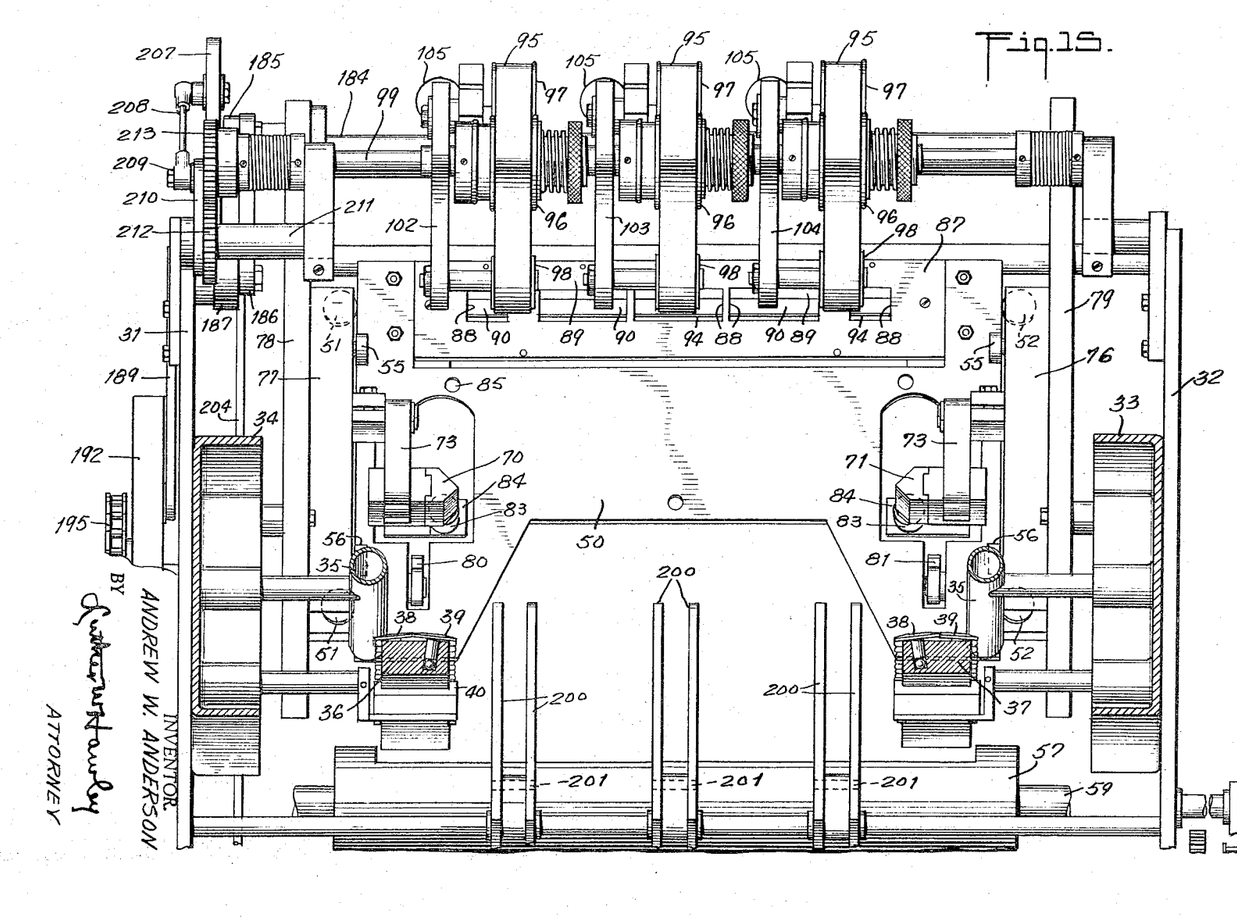
FIG. 15 is a rear elevational view of the structure shown in FIG. 10 taken substantially on line 15—15 of FIG. 10 looking in the direction of the arrows.

The driving mechanism for the belts 95 is illustrated particularly in FIGS. 9 and 15. The shaft 46 has an eccentric 202 mounted thereon on which is mounted an eccentric sleeve 203 and the sleeve is carried by the lower end of a pitman rod or link 204 connected at 205 to a bell crank lever comprising arms 206 and 207. Arm 207 is adjustably connected at its upper end to a link 208, the other end of which is pivoted at 209 to an arm 210 mounted on a stub shaft 211 which has also connected thereto a gear 212 which meshes with a gear 213 on the shaft 99 which drives the belts 95. The rocking motion of the gear 213 driving the shaft 99 through a spring clutch imparts an intermittent one direction movement to shaft 99 and the shaft 99 drives the belt pulleys through a spring or tension connection. Thus it will be seen the belts will be driven intermittently and being held in contact with the blank supply as shown in FIG. 11 by weight 105, will firmly hold said blanks against plate 50 forcing the first blank into correct position to be picked off by finger 90. From the showing in FIG. 15 it will be noted that adjustment is made for the spring pressure against the pulleys by means of a plurality of nuts on the shaft 99 and the tension can be regulated. When sufficient blanks have been accumulated at the forward end of the chute the pressure of the belt feed will be relieved by the slippage between the pulleys 96 and the shaft 99.

Figure 4:
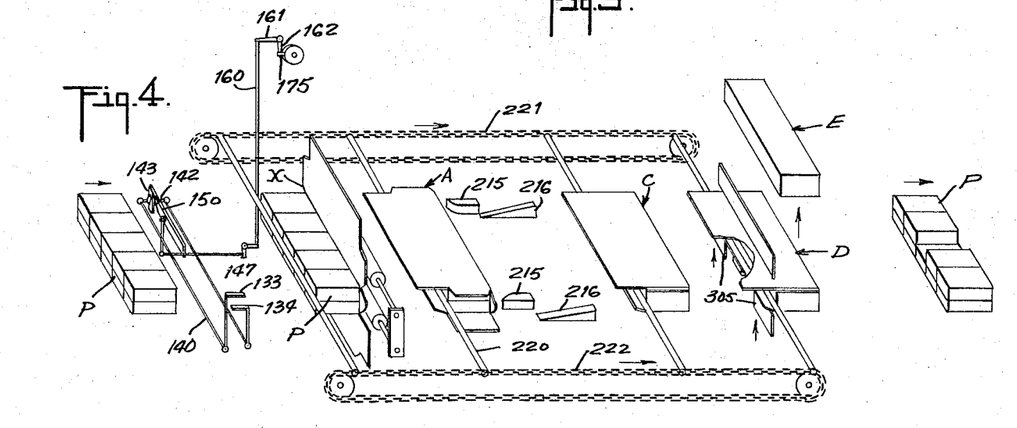
FIG. 4 is a perspective plan view showing diagrammatically the detectors for detecting a missing package and the progress of the assembled packages through the successive stages of the folding operation.

FIGS. 2, 3 and 4 illustrate the progress of the assembled packages through the machine and illustrate the various folding operations. In FIG. 4 the group of packages, in this case a full complement of packages, is about to move along the table 30 in position to be checked by the detector fingers shown particularly in FIGS. 1, 5, 6, 7 and 8. After the detector fingers have engaged the end packages the trip for the arm 150 is released and in the manner hereinbefore described the clutch shown particularly in FIG. 5A is so controlled as to feed the blanks downwardly into the path of the assembled packages. This position is shown at X in FIG. 4. As the group of assembled packages engages the surface of the carton fed into the path of movement of the packages the carton is folded over the top and bottom and advance end of the group of packages and takes the position and form shown at A in FIGS. 3 and 4. In further movement of the carton and packages the end flaps 67 and 68 are folded inwardly by folders 215 and the end flaps 65 and 66 are folded inwardly by folders 216, flat against the outer packages in the group. Thus the carton and flaps take the position shown at C in FIGS. 3 and 4. The carton and contents are fed along the table 30 during the operation shown diagrammatically in FIG. 4 by a series of feed rods or pushers 220 carried by feed chains 221 and 222. These bars engage the rear edges of the packages during the feeding movement.

As above stated the assembled packages are first checked by the feelers or detector fingers 133 and 134 as shown in FIG. 7 before the carton blank feed is operated to feed the blanks downwardly. In FIG. 7 the various control parts are illustrated in the positions taken to actuate the clutch and feed the blanks downwardly. The pivot pin 151 at one end of the arm 150 is connected to one end of a link 225 and the bottom of the link 225 is connected at 226 to arm 227.

After the arm 150 is released and sets the blank driving and feeding mechanism into operation, the arm is reset by a cam 228 mounted on a shaft 229 which also has connected thereto a cam 230 which engages a roller 231 on the end of arm 145 and thus swings the arms in a clockwise direction to reset the upper end of the arm 143 beneath the end 149 of the arm 150. The driving connections for the foregoing operations are shown particularly in FIGS. 1 and 24 from which it will be clear that the gear 118 on the shaft 117 which meshes with the gear 232 on a shaft 233. The shaft 233 also has mounted thereon a bevel gear 234 which meshes with the bevel gear 235 on shaft 236. Shaft 236 also has connected thereto a gear 237 which meshes with a gear 238 on a jack shaft 239. The gear 238 meshes with gear 240 on the cam shaft 29. The shaft 239 has mounted on the outer end thereof a bevel gear 241 which meshes with a bevel gear 242 on a stub shaft 243 which has also mounted thereon a sprocket 244 which drives a chain 245 and a sprocket 246 on a shaft 247. The shaft 247 has a sprocket 248 which drives the feed chains 132 disposed above the receiving end of the platform 30. The chains 132 carry lugs 131 on which are mounted plates 130 which engage and feed the packages along the table and deliver the packages and cartons to the position shown in FIG. 4 in which they are engaged by the pusher bars 220 and chains 221 and 222. The chains 221 and 222 are driven from the shaft 120 by sprockets 250 and 251 in the manner shown in FIG. 1.

*Elevator and elevator control*

This structure is shown particularly in FIGS. 1 and 17 to 23 inclusive. From the position shown at D in FIG. 4 the cartons and contents thereof are fed onto an elevator platform 252 provided that a carton blank has been fed downwardly into the path of the packages and the packages are disposed in the carton which has been folded around the top rear surface, bottom surface and end surfaces of the packages. The elevator and platform are enclosed between side walls 253 and 254 which extend upwardly from the platform 30, a front wall 317 with an opening 274 to admit the carton to platform 252, and a rear partial wall composed of hinged doors 318 and 319. When a package and contents have been disposed on the elevator 252 in the position shown in FIG. 18 and pusher bar or feed rod 220 continues around its path the rod 220 will engage the rearwardly projecting flap 61 of the carton and bend this flap downwardly against the roller 255 on a rod 256 carried by an arm 257 mounted on a shaft 258. The shaft 258 has also secured thereto an arm 259 which controls the release of the elevator operating drive.

Figure 18:
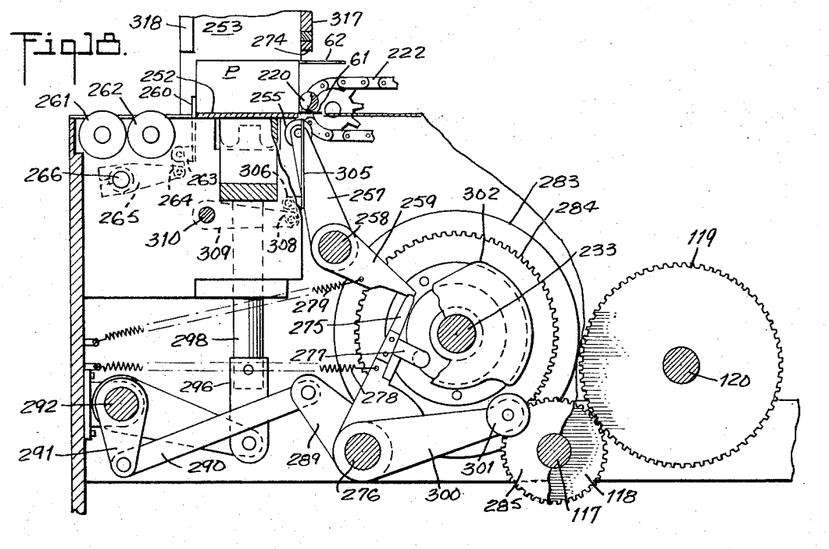
FIG. 18 is a detailed sectional elevation taken substantially on line 18—18 of FIG. 16 looking in the direction of the arrows and showing the control mechanism for the elevator.
Figures 19, 20:
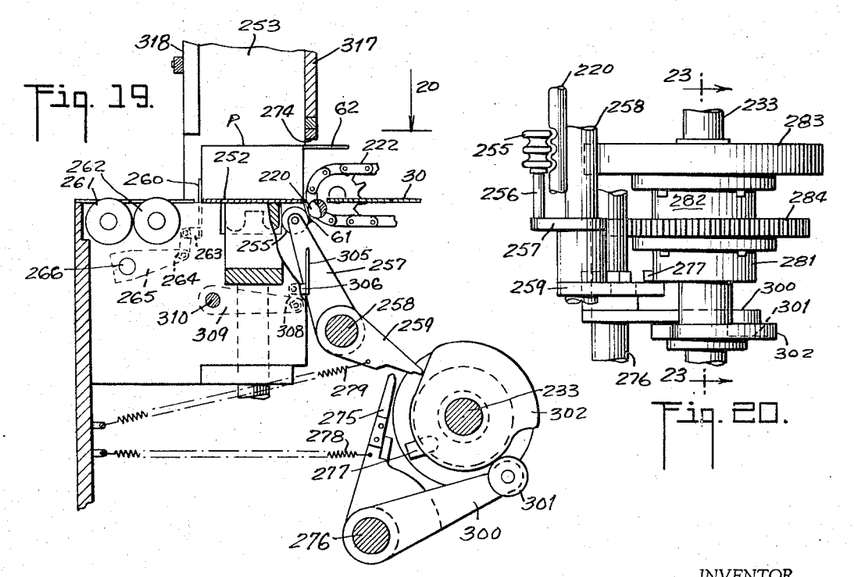
FIG. 19 is a view similar to FIG. 18 but showing the control mechanism after it has been tripped by a tab on the carton and the carton with a full complement of packages has been fed to the elevator.
FIG. 20 is a plan view looking at right angles to FIG. 19 and taken substantially in the direction of the arrows designated 20 in FIG. 19.

As the carton and contents are fed onto the platform 252 the back of the package engages a vertically movable stop plate 260 which is moved upwardly to the position shown in FIGS. 18 and 19 as a full carton is fed onto the elevator. However, when a full complement of packages has not been fed through the machine the packages are left on the elevator platform 252, which is inoperative due to no carton being present and upon arrival of next carton are pushed to discharge rollers 261 and 262 which rotate at a high speed to remove the packages quickly allowing rising stops 260 to hold carton.

FIG. 19 illustrates the control and operation of the back stop 260. The stop has projecting rearwardly therefrom a lug 263 which is connected by a link 264 to the outer end of an arm 265 mounted on a shaft 266. The shaft 266 has also mounted on the outer end thereof an arm 267 (see FIG. 22) which carries at the end of the arm a roller 268 engaged by a cam 269 mounted on a stud 270. The cam 269 has secured thereto a sprocket 271 which is driven by a chain 272 which in turn is driven by a sprocket 273 mounted on the shaft 233.

The elevator operating mechanism is so controlled that the elevator will not be raised unless a carton is deposited thereon. Otherwise, as above described the incomplete group of packages is pushed into the elevator and upon arrival of next carton, out of the machine. This control mechanism is illustrated particularly in FIGS. 17 to 22 inclusive. It has been explained above that when the pusher rod which has fed a carton and its contents to elevator continues its path as shown in FIG. 19, the flap 61 is bent downwardly and since the flap is disposed between the roller 255 and the rod 220 the arm 257 will be released from the position shown in FIG. 18 and will be forced to the position shown in FIG. 19, whereupon the arm 259 will be raised permitting a clutch control arm 275 mounted on a shaft 276 to swing in an anti-clockwise direction under the action of a spring 278 to the position shown in FIG. 19.

Figure 23:
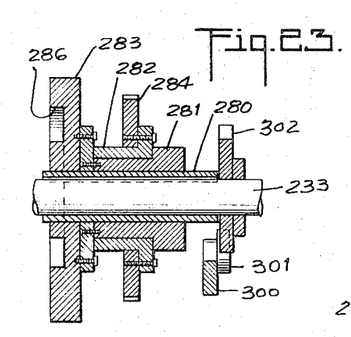
FIG. 23 is a sectional elevation taken substantially on line 23—23 of FIG. 20 looking in the direction of the arrows.

The arm 275 controls the position of a pivoted clutch control member 277 and as the arm 275 moves away from engagement with the member 277 the member 277 will engage the clutch parts illustrated more particularly in FIG. 23, thus setting in operation the drive for the elevator.

The clutch for controlling the drive for the elevator driving mechanism as shown in FIG. 23 is mounted on a sleeve 280 which in turn is keyed to the shaft 233. The clutch comprises two parts 281 and 282 mounted on the sleeve 280 and the clutch part 281 has secured thereto a cam 283. The clutch parts 281 and 282 are engaged and disengaged with each other by the clutch control member 277 and when this member 277 is released by the anti-clockwise movement of the arm 259 the clutch members are connected together in driving relation to each other. On the clutch part 282 is mounted a gear 284 which is driven by a gear 285 mounted on shaft 117.

Figure 17:
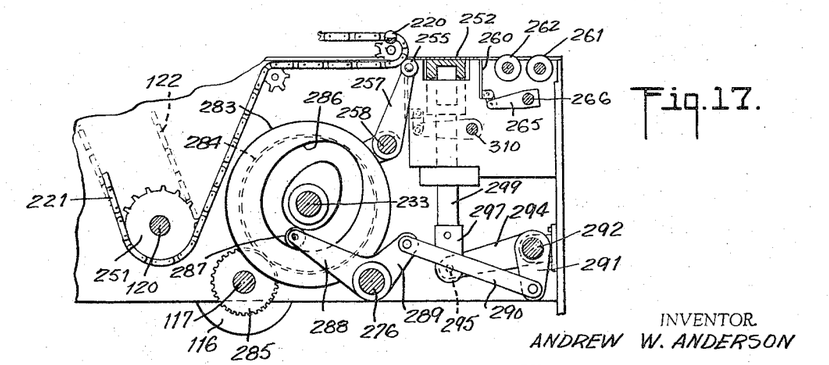
FIG. 17 is a detailed sectional elevation taken substantially on line 17—17 of FIG. 16 looking in the direction of the arrows.
Figure 21:
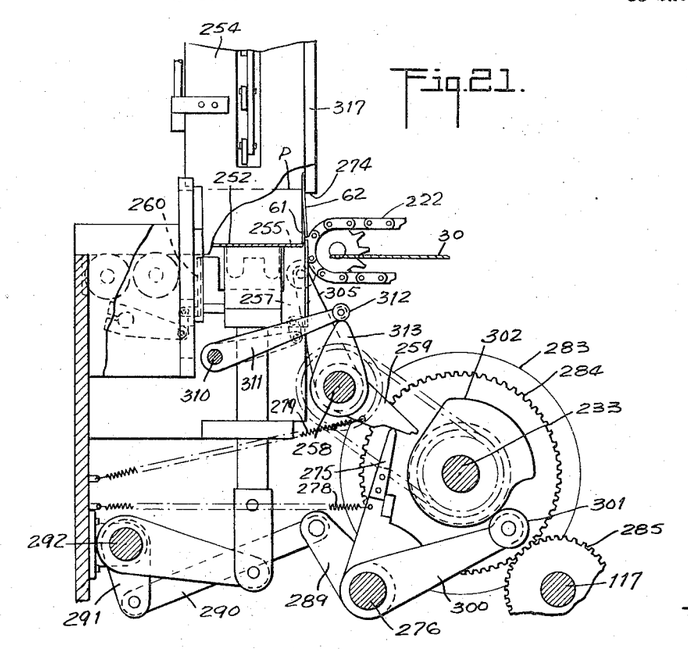
FIG. 21 is a detailed sectional elevation on an enlarged scale taken substantially on line 21—21 of FIG. 16 and looking in the direction of the arrows.
Figure 22:
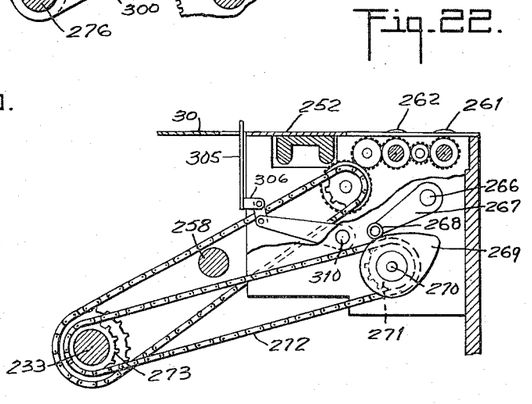
FIG. 22 is a detailed sectional elevation on an enlarged scale taken substantially on line 22—22 of FIG. 16 looking in the direction of the arrows.

Referring to FIG. 17, the cam 283 which is mounted on the shaft 233 and is driven in the manner just described, has a cam groove 286 in which is engaged a roller 287 mounted on the end of the bell crank lever comprising arms 288 and 289 and pivoted on shaft 276, the end of arm 289 being connected by a link 290 to an arm 291 mounted on a shaft 292. At the ends of the shaft 292 are arms 293 and 294 which are pivoted at their outer ends at 295 to a pair of links 296 and 297 which in turn are pivoted to the lower ends of plungers 298 and 299 which at their upper ends are connected to the elevator 252. An arm 300 has a roller 301 at the end thereof which, under the influence of spring 278, co-acts with a cam 302 mounted on the shaft 233. The cam 302 by its engagement with the roller 301 and through the arms 300 and 285 resets arm 275 so that the outer end thereof biased by a spring 279 will engage the outer end of the arm 259. This operation engages the clutch control member 277 and thus disconnects the clutch parts 281 and 282 which holds the elevator inoperative. After the carton has been placed on the elevator in the position as shown in FIG. 18, a plate 305 which is disposed below the elevator platform is moved up in the following manner to engage the flap 61 and fold this flap upwardly. This takes place before the flap 62 is folded downwardly as the carton moves upwardly in the elevator. The plates 305 have extending rearwardly therefrom lugs 306 connected by a link to the end of an arm 309 mounted on a pin 310. There is also connected to pin 310 an arm 311 having at the outer end thereof a roller 312 which engages cam 313 mounted on a shaft 258. As the cam 313 rotates with the shaft 258 the plates 305 will move upwardly and fold the flap 61 upwardly to the position shown in FIG. 21. This operation is carried out as the elevator starts to lift the filled carton as shown in FIG. 21. The flap 61 is raised by the fingers 305 before the movement of the carton upward in the elevator has caused the other flap 62 to be closed.

Figure 16:
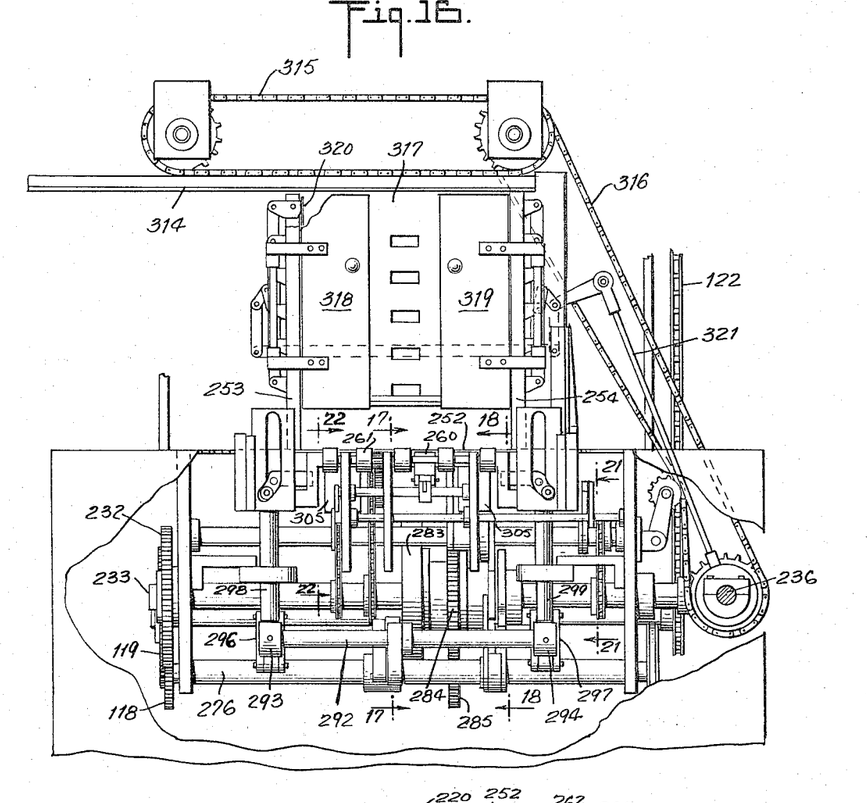
FIG. 16 is a rear elevational view of the structure shown in FIG. 1 taken substantially on line 16—16 of FIG. 1 looking in the direction of the arrows.

The elevator moves the filled carton upwardly into the passage between the walls 253 and 254 where its rests until the next filled carton is moved into the passage by the next movement of the elevator. Thus the cartons are fed upwardly between the walls 253 and 254 until the top carton reaches a position opposite a platform 314 along which the filled cartons are fed by a discharge conveyer 315 having lugs or cross rods extending between two chains. The conveyer chains 315 and discharge conveyer are driven by a sprocket and chain connection 316 from the shaft 236. The front wall of the elevator is shown at 317 in FIG. 16 and the wall in back has a pair of doors 318 and 319 to give access to the cartons in the elevator if it is desired. The side walls of the elevator have a thin metallic sheet 320 extending from the top to the bottom thereof and pressure exerted against the flexible plates 320 by means of suitable linkage which is actuated by a pitman rod 321 connected by an eccentric to the shaft 236. It will be understood that the carton blank is provided with an adhesive to secure the flaps in folded position.

From the foregoing specification it will be clear that the cartoning machine embodies control mechanism for controlling the vertical feed of the carton blanks in such a manner that this feed will not be in operation when one or more packages is absent from the group assembled for cartoning.

Furthermore, in the machine means is provided whereby an incomplete group of packages will be discharged from the machine but a carton having a full complement of packages will be lifted by an elevator to a platform from which the filled cartons are discharged.

Although one specific embodiment of the invention has been particularly shown and described it will be understood that changes in the structure and arrangement of cooperating parts will be named without departing from the scope or spirit of the invention as expressed in the following claims.

I claim:

1. In a cartoning machine, means to feed a blank into the path of movement of a predetermined number of assembled articles to be enclosed therein, means for feeding the articles into engagement with the blank, operating means for the blank feed, detecting means engageable with selected ones of the articles and operatively connected to the blank feed means, operating means for disconnecting the said blank feed operating means when the detecting means indicate that the predetermined number of articles has not been assembled, means responsive to the detecting means for discharging an assembly of articles differing from the predetermined number, and means for transporting a blank and the predetermined number of the assembled articles in response to said detecting means.

2. In a cartoning machine, means including vertically reciprocable means and feed rollers to feed a blank into the path of movement of a predetermined number of assembled articles to be enclosed therein, means for feeding the articles into engagement with the blank, operating means for the blank feed, detecting means engageable with the selected ones of the articles and operatively connected to the blank feed means, operating means for disconnecting the said blank feed operating means when the detecting means indicate that the predetermined number of articles has not been assembled, means responsive to the detecting means for discharging an assembly of articles differing from the predetermined number, and means for transporting a blank and the predetermined number of the assembled articles in response to said detecting means.

3. In a cartoning machine, a hopper, means for supporting carton blanks in the hopper including bars in the hopper for engaging the bottoms of the blanks, means for reciprocating the bars, blank feeding means frictionally engageable with the upper edges of the blanks, a plate at the front of the hopper, and means carried by the plate and engageable over the upper edge of the front blank for feeding the blank downwardly, and means for reciprocating said plate.

4. In a cartoning machine, means for feeding an assembled group of packages into a carton blank, thereby folding the blanks around the bottom rear wall and top of the enclosed packages with the blank projecting beyond the front edge of the packages, a platform for receiving the cartons and enclosed packages, means for elevating said platform, operating means for said elevating means, and means engageable by the projecting portion of the carton for controlling the operation of said operating means for the elevating means.

5. In a cartoning machine, means for feeding an assembled group of packages into a carton blank, thereby folding the carton blanks around the packages with the blank projecting beyond the front edge of the packages, a carton delivery platform, means for moving the blanks and bottom rear wall and top of the enclosed packages to said delivery platform, operating means for said moving means, and means engageable by the projecting portion of the carton blank for controlling the operation of said operating means.

6. In a cartoning machine, means for feeding an assembled group of packages into a carton blank, thereby folding the blanks around the bottom rear wall and top of the enclosed packages with the blank projecting beyond the front edge of the packages, a platform for receiving the cartons and enclosed packages, means for elevating said platform, operating means for said elevating means, means engageable with the projecting portion of the carton for controlling the operation of said operating means for the elevating means, a plate forming a back stop for said platform, and means for raising and lowering the back stop plate.

7. In a cartoning machine, means for feeding a blank into the path of movement of a predetermined number of assembled articles to be enclosed therein, said assembled articles being arranged in two superposed sets each containing half of said predetermined number of articles, means for feeding said two sets of superposed articles into engagement with said blank, operating means for the blank feed, detecting means engageable with the articles of both sets and operatively connected to the blank feed and operating means for disconnecting the blank feed when the detecting means indicate that an article in either set is missing, means responsive to the detecting means for discharging an assembly of articles when an article in either set is missing, and means for transporting a blank and the predetermined number of assembled articles in response to said detecting means.

References Cited

UNITED STATES PATENTS

| | | | |
|---|---|---|---|
| 2,095,938 | 10/1937 | Schmitt | 53—73 X |
| 2,277,408 | 3/1942 | Molins et al. | 53—73 |
| 2,904,941 | 9/1959 | Midnight | 53—76 X |
| 2,917,887 | 12/1959 | Jackson | 53—230 |
| 3,125,841 | 3/1964 | Anderson | 53—230 X |
| 3,213,589 | 10/1965 | Hollenton | 53—73 X |

TRAVIS S. McGEHEE, *Primary Examiner.*